US008700056B2

(12) United States Patent
Rizzello et al.

(10) Patent No.: US 8,700,056 B2
(45) Date of Patent: Apr. 15, 2014

(54) SYSTEMS AND METHODS FOR REAL-TIME LOCATION

(75) Inventors: Marco Rizzello, Lecce (IT); Vincenzo Cacace, Lecce (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 253 days.

(21) Appl. No.: 13/221,797

(22) Filed: Aug. 30, 2011

(65) Prior Publication Data

US 2012/0077513 A1    Mar. 29, 2012

(30) Foreign Application Priority Data

Aug. 31, 2010   (IT) ................ VI2010A0237

(51) Int. Cl.
*H04W 24/00*     (2009.01)
(52) U.S. Cl.
USPC ............... 455/456.1; 455/404.2; 455/414.2
(58) Field of Classification Search
USPC ................. 455/456.1, 404.2, 414.2
See application file for complete search history.

(56) References Cited

U.S. PATENT DOCUMENTS

| 2006/0227751 | A1 | 10/2006 | Theobold et al. | |
| 2007/0281714 | A1 | 12/2007 | Douglas et al. | |
| 2010/0267397 | A1* | 10/2010 | Shen et al. | 455/456.1 |
| 2011/0183683 | A1* | 7/2011 | Das et al. | 455/456.1 |

OTHER PUBLICATIONS

Ralf Grossmann, Jan Blumenthal, Frank Golatowski, Dirk Timmermann, "Localization in Zigbee-based Sensor Networks", CELISCA, Center for Life Science Automation, Friedrich-Barnewitz-Str. 8, University of Rostock Faculty of Computer Science and Electrical Engineering, Institute of Applied Microelectronics and CE Richard-Wagner Str. 31, 18119 Rostock-Warnemuende, 8 pages.
Neal Patwari, Alfred O. Hero, Matt Perkins, Neiyer S. Correal, Robert J. O'Dea, "Relative Location Estimation in Wireless Sensor Networks", IEEE Transactions on Signal Processing, vol. 51, No. 8, Aug. 2003, 12 pages.
Search Report for Italian Application No. VI20100237, Ministero dello Sviluppo Economico, Munich, Feb. 21, 2011, pp. 3.
Xingfa Shen, Zhi Wang, Peng Jiang, Ruizhong Lin, and Youxian Sun, "Connectivity and RSSI Based Localization Scheme for Wireless Sensor Networks", ICIC 2005, Part II, LNCS 3645, pp. 578-587, 2005. Springer-Verlag Berlin Heidelberg 2005.
Ximei-Liu and Zhangchao, Hu Jizhen, "A new localization algorithm in complex environment for wireless sensor networks", Proceedings of the IEEE International Conference on Automation and Logistics Qingdao, China, Sep. 2008, pp. 3045-3049.
Jan Blumenthal, RalfGrossmann, Frank Golatowski, and Dirk Timmermann, "Weighted Centroid Localization in Zigbee-based Sensor Networks", Intelligent Signal Processing, 2007. WISP 2007. IEEE International Symposium on, IEEE, Piscataway, NJ, USA, Oct. 3, 2007, pp. 1-6.

* cited by examiner

*Primary Examiner* — Nghi H Ly
(74) *Attorney, Agent, or Firm* — Graybeal Jackson LLP

(57) ABSTRACT

An embodiment concerns the field of real-time location systems (RTLS) based on RSSI (Received Signal Strength Indication) measurements. An embodiment is based on determining the distances between wireless device of a network based on a model that describes the relation of the RSSI value relative to the packet exchanged between nodes as a function of the distance, wherein said model depends on at least one characteristic parameter of the transmission channel and wherein at least said characteristic parameter of the transmission channel is determined periodically and automatically, exploiting the known distances among fixed nodes. In this way, the errors relative to possible time-variability of the transmission channel are reduced and the accuracy and stability of the location measurements are increased.

37 Claims, 5 Drawing Sheets

| links | A↔B | | A↔C | | A↔D | | B↔C | | B↔D | | C↔D | | |
|---|---|---|---|---|---|---|---|---|---|---|---|---|---|
| d [m] | 4.6 | | 7 | | 4.6 | | 4.6 | | 6 | | 4.6 | | |
| RSSI [dBm] | -52.5 | | -56.5 | | -54.5 | | -54 | | -54 | | -50 | | |
| α | Est. Dist. | Est. Err. | Est. Dist. | Est. Err. | Est. Dist. | Est. Err. | Est. Dist. | Est. Err. | Est. Dist. | Est. Err. | Est. Dist. | Est. Err. | AVG(Err²) |
| 1 | 11.22 | 6.62 | 28.18 | 21.18 | 17.78 | 13.18 | 15.85 | 11.25 | 15.85 | 9.85 | 6.31 | 1.71 | 148.81 |
| 1.1 | 9.01 | 4.41 | 20.81 | 13.81 | 13.69 | 9.09 | 12.33 | 7.73 | 12.33 | 6.33 | 5.34 | 0.74 | 65.49 |
| 1.2 | 7.50 | 2.90 | 16.16 | 9.16 | 11.01 | 6.41 | 10.00 | 5.40 | 10.00 | 4.00 | 4.64 | 0.04 | 29.74 |
| 1.3 | 6.42 | 1.82 | 13.04 | 6.04 | 9.15 | 4.55 | 8.38 | 3.78 | 8.38 | 2.38 | 4.12 | 0.48 | 13.45 |
| 1.4 | 5.62 | 1.02 | 10.86 | 3.86 | 7.81 | 3.21 | 7.20 | 2.60 | 7.20 | 1.20 | 3.73 | 0.87 | 5.86 |
| 1.6 | 4.53 | 0.07 | 8.06 | 1.06 | 6.04 | 1.44 | 5.62 | 1.02 | 5.62 | 0.38 | 3.16 | 1.44 | 1.08 |
| 1.7 | 4.15 | 0.45 | 7.13 | 0.13 | 5.44 | 0.84 | 5.08 | 0.48 | 5.08 | 0.92 | 2.96 | 1.64 | 0.78 |
| 1.8 | 3.83 | 0.77 | 6.39 | 0.61 | 4.95 | 0.35 | 4.64 | 0.04 | 4.64 | 1.36 | 2.78 | 1.82 | 1.04 |
| 1.9 | 3.57 | 1.03 | 5.80 | 1.20 | 4.55 | 0.05 | 4.28 | 0.32 | 4.28 | 1.72 | 2.64 | 1.96 | 1.57 |
| 2 | 3.35 | 1.25 | 5.31 | 1.69 | 4.22 | 0.38 | 3.98 | 0.62 | 3.98 | 2.02 | 2.51 | 2.09 | 2.23 |
| 2.2 | 3.00 | 1.60 | 4.56 | 2.44 | 3.70 | 0.90 | 3.51 | 1.09 | 3.51 | 2.49 | 2.31 | 2.29 | 3.66 |
| 2.5 | 2.63 | 1.97 | 3.80 | 3.20 | 3.16 | 1.44 | 3.02 | 1.58 | 3.02 | 2.98 | 2.09 | 2.51 | 5.64 |
| 2.8 | 2.37 | 2.23 | 3.30 | 3.70 | 2.80 | 1.80 | 2.68 | 1.92 | 2.68 | 3.32 | 1.93 | 2.67 | 7.29 |
| 3 | 2.24 | 2.36 | 3.04 | 3.96 | 2.61 | 1.99 | 2.51 | 2.09 | 2.51 | 3.49 | 1.85 | 2.75 | 8.22 |
| 3.2 | 2.13 | 2.47 | 2.84 | 4.16 | 2.46 | 2.14 | 2.37 | 2.23 | 2.37 | 3.63 | 1.78 | 2.82 | 9.02 |
| 3.5 | 2.00 | 2.60 | 2.60 | 4.40 | 2.28 | 2.32 | 2.20 | 2.40 | 2.20 | 3.80 | 1.69 | 2.91 | 10.03 |
| 3.8 | 1.89 | 2.71 | 2.41 | 4.59 | 2.13 | 2.47 | 2.07 | 2.53 | 2.07 | 3.93 | 1.62 | 2.98 | 10.87 |
| 4 | 1.83 | 2.77 | 2.30 | 4.70 | 2.05 | 2.55 | 2.00 | 2.60 | 2.00 | 4.00 | 1.58 | 3.02 | 11.35 |

Fig. 1B

| links | $A \leftrightarrow B$ | | $A \leftrightarrow C$ | | $A \leftrightarrow D$ | | $B \leftrightarrow C$ | | $B \leftrightarrow D$ | | $C \leftrightarrow D$ | | |
|---|---|---|---|---|---|---|---|---|---|---|---|---|---|
| d [m] | 4,6 | | 7 | | 4,6 | | 4,6 | | 6 | | 4,6 | | |
| RSSI [dBm] | -52,5 | | -56,5 | | -54,5 | | -54 | | -54 | | -50 | | |
| α | Est. Dist. | Est. Err. | Est. Dist. | Est. Err. | Est. Dist. | Est. Err. | Est. Dist. | Est. Err. | Est. Dist. | Est. Err. | Est. Dist. | Est. Err. | SQRT(AVG(Err²)) |
| 1 | 11,22 | 6,62 | 28,18 | 21,18 | 17,78 | 13,18 | 15,85 | 11,25 | 15,85 | 9,85 | 6,31 | 1,71 | 12,20 |
| 1,1 | 9,01 | 4,41 | 20,81 | 13,81 | 13,69 | 9,09 | 12,33 | 7,73 | 12,33 | 6,33 | 5,34 | 0,74 | 8,09 |
| 1,2 | 7,50 | 2,90 | 16,16 | 9,16 | 11,01 | 6,41 | 10,00 | 5,40 | 10,00 | 4,00 | 4,64 | 0,04 | 5,45 |
| 1,3 | 6,42 | 1,82 | 13,04 | 6,04 | 9,15 | 4,55 | 8,38 | 3,78 | 8,38 | 2,38 | 4,12 | 0,48 | 3,67 |
| 1,4 | 5,62 | 1,02 | 10,86 | 3,86 | 7,81 | 3,21 | 7,20 | 2,60 | 7,20 | 1,20 | 3,73 | 0,87 | 2,42 |
| 1,6 | 4,53 | 0,07 | 8,06 | 1,06 | 6,04 | 1,44 | 5,62 | 1,02 | 5,62 | 0,38 | 3,16 | 1,44 | 1,04 |
| 1,7 | 4,15 | 0,45 | 7,13 | 0,13 | 5,44 | 0,84 | 5,08 | 0,48 | 5,08 | 0,92 | 2,96 | 1,64 | 0,89 |
| 1,8 | 3,83 | 0,77 | 6,39 | 0,61 | 4,95 | 0,35 | 4,64 | 0,04 | 4,64 | 1,36 | 2,78 | 1,82 | 1,02 |
| 1,9 | 3,57 | 1,03 | 5,80 | 1,20 | 4,55 | 0,05 | 4,28 | 0,32 | 4,28 | 1,72 | 2,64 | 1,96 | 1,25 |
| 2 | 3,35 | 1,25 | 5,31 | 1,69 | 4,22 | 0,38 | 3,98 | 0,62 | 3,98 | 2,02 | 2,51 | 2,09 | 1,49 |
| 2,2 | 3,00 | 1,60 | 4,56 | 2,44 | 3,70 | 0,90 | 3,51 | 1,09 | 3,51 | 2,49 | 2,31 | 2,29 | 1,91 |
| 2,5 | 2,63 | 1,97 | 3,80 | 3,20 | 3,16 | 1,44 | 3,02 | 1,58 | 3,02 | 2,98 | 2,09 | 2,51 | 2,38 |
| 2,8 | 2,37 | 2,23 | 3,30 | 3,70 | 2,80 | 1,80 | 2,68 | 1,92 | 2,68 | 3,32 | 1,93 | 2,67 | 2,70 |
| 3 | 2,24 | 2,36 | 3,04 | 3,96 | 2,61 | 1,99 | 2,51 | 2,09 | 2,51 | 3,49 | 1,85 | 2,75 | 2,87 |
| 3,2 | 2,13 | 2,47 | 2,84 | 4,16 | 2,46 | 2,14 | 2,37 | 2,23 | 2,37 | 3,63 | 1,78 | 2,82 | 3,00 |
| 3,5 | 2,00 | 2,60 | 2,60 | 4,40 | 2,28 | 2,32 | 2,20 | 2,40 | 2,20 | 3,80 | 1,69 | 2,91 | 3,17 |
| 3,8 | 1,89 | 2,71 | 2,41 | 4,59 | 2,13 | 2,47 | 2,07 | 2,53 | 2,07 | 3,93 | 1,62 | 2,98 | 3,30 |
| 4 | 1,83 | 2,77 | 2,30 | 4,70 | 2,05 | 2,55 | 2,00 | 2,60 | 2,00 | 4,00 | 1,58 | 3,02 | 3,37 |

Fig. 2B

| $P_0$ | $E_1$ | $E_2$ | $\alpha_{E2}$ | $E_3$ |
|---|---|---|---|---|
| $w_E$ | 25% | 75% | | |
| -35 | 14,30 | 0,82 | 2,5 | 4,19 |
| -36 | 11,50 | 0,69 | 2,5 | 3,39 |
| -37 | 9,22 | 0,86 | 2,5 | 2,95 |
| -38 | 7,39 | 0,73 | 2,2 | 2,40 |
| -39 | 5,93 | 0,96 | 2,0 | 2,20 |
| -40 | 4,79 | 0,81 | 2,0 | 1,81 |
| -41 | 3,94 | 0,84 | 1,8 | 1,62 |
| -42 | 3,35 | 0,89 | 1,7 | 1,51 |
| -43 | 2,95 | 0,99 | 1,6 | 1,48 |
| -44 | 2,73 | 1,04 | 1,4 | 1,46 |
| -45 | 2,65 | 1,13 | 1,3 | 1,51 |
| -46 | 2,72 | 1,26 | 1,2 | 1,63 |
| -47 | 2,91 | 1,44 | 1,1 | 1,81 |

Fig. 2C

SYSTEMS AND METHODS FOR REAL-TIME LOCATION

PRIORITY CLAIM

The instant application claims priority to Italian Patent Application No. VI2010A000237, filed Aug. 31, 2010, which application is incorporated herein by reference in its entirety.

TECHNICAL FIELD

An embodiment concerns the field of real-time location systems (RTLS). In particular, an embodiment concerns systems and methods of use of RSSI (Received Signal Strength Indication) metric for real-time location. Even more specifically, an embodiment concerns systems and methods for real-time location that may be used for so-called Wireless Sensor Networks (WSN).

BACKGROUND

Real-time location systems (so-called RTLS) allow the geographical position of a given target to be estimated, like for example a person or an object, in a given indoor or outdoor environment. Typically, RTLS systems are integrated in so-called Wireless Sensor Networks (WSN), consisting of wireless devices—all the nodes of the network—some of which are equipped with sensors, whose data is sent to other user nodes.

WSNs are special networks that may be created ad-hoc, i.e., with maximum flexibility, and they may be easily installed, removed, and updated thanks to the lack of cables. This makes them very versatile and not so invasive: indeed, they may be able to co-exist with any other network, and interact with or extend existing networks. Their topology is dynamic; it is typically not necessary to know a priori the deployments of the nodes, and the network maintains its connectivity, even if the nodes move or have failures in some of them.

One of the purposes of a network of sensors is to produce, over an extended time period, a single global information based on a series of local data coming from the single sensors.

The sensor nodes are equipped with an on-board microcontroller, although of limited capacity. This may allow communication to be minimized and thus allows energy usage to be optimized, since every node may have a limited power resource. Once set in operation, the node typically works autonomously; it may receive commands from the coordinator node that manages the network and execute them only if its embedded code implements the functions specified by the command. The design of a WSN uses the available information efficiently and effectively to define the resources, the coverage area, the organization of the nodes, and the level of cooperation among them.

There are multiple application scenarios for WSNs. Indeed, such networks may be seen as a set of sensors of different types capable of detecting magnitudes such as temperature, humidity, pressure, and light, but also capable of detecting the movement of vehicles, the composition of the land, the noise level, and many other quantities and characteristics. The application fields where the networks of sensors may have natural use are various: from commercial and industrial sectors to environmental sectors as well as at home.

In all these scenarios, location is one of the most relevant functionalities. Indeed, the interest in location derives from the fact that information measured by a device is of some interest only if it is space-time correlated, i.e., if we are aware of the time and place in which this quantity was measured. For example, the management of lighting in the various rooms of a building allows the various areas to be lit in a differentiated manner, even according to the external lighting or else whether or not somebody is at a specific desk. Therefore, a node or the network must know the node's position and in which room it was placed for the node and network to operate correctly.

Generally, for location methods, it is presumed that the positions of some nodes of the network are known and that these nodes will not move over time. These nodes are called "anchor nodes," they are installed within the environment to be monitored, and, through an appropriate procedure of configuration, they "know" their own coordinates.

The other nodes, called "blind nodes," do not know their own coordinates and may move within the environment to be monitored: for example they may be placed on mobile objects or they may be moved due to external events (e.g., wind or movement in water).

Main-location solutions proposed in the literature may be distinguished between centralized solutions and distributed solutions.

In the case of a centralized approach, there is a special node, the coordinator or a PC coupled to the network, which generally has greater calculation capacity and energy access with respect to the other nodes. Such a device collects the information coming from all the nodes of the network to determine their relative positions; then such information may be sent to the nodes that request it.

In the distributed approach, on the other hand, every node exchanges information just with the nodes close to it and each of the blind nodes uses the information available locally to determine its own position. An advantage of a distributed approach is the greater scalability; however, the computing capabilities of the nodes of a WSN are quite limited, and this entails restrictions on the complexity of the location algorithm in terms of clock cycles, information exchanged, and memory occupation.

A centralized system, on the other hand, suffers less from such limitations and may be easily implemented if there is already a functionality for a centralized collection of information. On the other hand, an algorithm of this type may require that every node belonging to the network sends messages to the calculation center, thus possibly creating an overload of communication that could risk clogging up the network. Moreover, such an approach may not be usable in environments with many nodes in motion, because of the delay of propagation and, finally, it may create problems relative to privacy.

In both approaches, the position of the blind nodes is generally determined by exploiting the information relative to the position of the anchor nodes in the monitored environment and the information that places the position of the blind nodes in relation with the position of the anchor nodes. Usually, for this functionality scope, the measurements of the distance deriving from the exploitation of the radio communications of the nodes and, therefore, of the radiofrequency signals properties, are used.

In general, location is performed in three steps: configuration, ranging, and estimation of the position.

In the configuration step, the positions of the anchor nodes placed into the environment that is to be monitored are fixed and the system is made aware of the information relative to these positions.

In the ranging step, the distances between each blind node and the various anchors are estimated.

In the step of estimating the position, the coordinates of the blind nodes within the environment that is to be monitored are estimated on the basis of the information obtained in the configuration step and in the ranging step. For example, the coordinates of the blind nodes may be estimated by lateration.

The ranging step, i.e., the step of estimating the distances, often represents the most critical step of the location process due to the various factors that may influence the measurements.

In the literature, there are many techniques for estimating the distances for wireless devices. In particular, various employed metrics are obtained from the signals exchanged between the nodes. For example, it is possible to use the Time of Fly (ToF), the Time difference of Arrival (TdoA), or the Angle of Arrival (AoA).

However, one of the metrics often used in literature for the ranging step is the so-called RSSI (Received Signal Strength Indicator), i.e., the energy level detected by the radio over the current channel and relative to the packet that is being received. Hypothesising a propagation model of the signal in air as a function of the distance, it may be possible to estimate the transmitter-receiver distance from the evaluation of the RSSI.

In particular, in the case of WSNs, the RSSI value may be measured directly from the radiofrequency signal used by the nodes to communicate data and control information. In this way, every device may obtain information on the distances from its nearby nodes by exploiting the normal reception of the packets, not requiring any additional hardware component. However, if on the one hand a location system based on the measurement of the RSSI values has the advantage of being cost-effective, on the other hand, a possible drawback is correlated to the highly dynamic nature of the received signal. The RSSI value, and consequently the distance estimation value, is greatly influenced by various phenomena which take place particularly in indoor environments. In particular, factors that influence the RSSI values indoors include the variability of the transmitter, the variability of the receiver, the orientation of the antenna, and the multi-path fading and shadowing of an RF channel.

In general, three main components are identified in the channel model that correlate the power received to the distance between the transmitter and the receiver: a dominant term that depends one the distance, a term that takes into account the slow fading, and a term that takes into account the fast fading.

The dominant term indicates that the received power has, as a function of the distance, a trend of the type:

$$P_R(d) = P_R(d_0)\left(\frac{d_0}{d}\right)^a \tag{1}$$

in which: $P_R(d_0)$ represents the power (in Watts) received at the reference distance $d_0$ (in meters) and the coefficient $\alpha$ is named as attenuation factor. The slow fading, which manifests itself with a series of slow oscillations of the power received with respect to the main component, is modelled by means of a Log-Normal distribution, whereas the fast fading, characterized by rapid oscillations around the slow fading component, is described through a Rice distribution.

Since the effects of the fast fading may be reduced through the use of Direct Sequence Spread Spectrum (DSSS) techniques, like those adopted for example in standard PHY IEEE 802.15.4, the model used to correlate the power received to the distance between the transmitter and the receiver may take into account just only the first two components. Therefore:

$$P_R(d) = P_R(d_0)\left(\frac{d_0}{d}\right)^a + X_L \tag{2}$$

in which $\chi_L$ represents a Log-Normal random variable.

Expressing the value of the power received in dBm, the equation (2) becomes:

$$P_R(d)_{[dBm]} = P_R(d_0)_{[dBm]} + 10\alpha\log_{10}\left(\frac{d_0}{d}\right) + X_g \tag{3}$$

where $\chi_g$ is a zero-mean Gaussian random variable with standard deviation $\sigma$.

From the previous equation follows the formula of the Path Loss Model:

$$PL(d) = PL_0 + 10\alpha\log_{10}\left(\frac{d}{d_0}\right) + X_g \tag{4}$$

in which:
$PL(d) = P_T - P_R(d)$ represents the attenuation undergone by the radio signal transmitted at power $P_T$ after having traveled a distance equal to d;
$PL_0 = PL(d_0)$ is the attenuation measured at the reference distance $d_0$.

The path-loss propagation model thus depends on different parameters like the attenuation coefficient, the power received, and the distances between the nodes.

The equation (4) may be expressed in dBm in order to refer directly to the RSSI values. The equation (4) thus becomes:

$$RSSI = P_T - PL(d_0) - 10\alpha\log_{10}\left(\frac{d}{d_0}\right) + X_g \tag{5}$$

Given that $\chi_g$ is a Gaussian random variable that has an unknown power with zero mean, it may be possible to eliminate this term from the equation considering the statistical average of the magnitudes. Given that the process is ergodic since it is stationary, the statistical average converges to the temporal average. For these reasons, we thus consider the mean value of the RSSI received by every device.

The model obtained is thus:

$$\overline{RSSI} = P_0 - 10\alpha\log_{10}\left(\frac{d}{d_0}\right) \tag{6}$$

where $\overline{RSSI}$ is the mean value of the RSSI measured for the received packets coming from the same source.

The equation (6) shows that the power decay of a signal from the transmitter node to the receiver node depends on three parameters:
 the reference distance $d_0$;
 the attenuation coefficient $\alpha$ that depends on the type of channel in which the signal propagates;
 the value ($P_0$) of the power received at the reference distance $d_0$ ($P_0 = P_T - PL(d_0)$).

In conventional RTLS systems based on RSSI, the parameters of the propagation model of the signal in air as a function of the distance are set a priori. In particular, for example, based on Patwari et al. "Relative Location Estimation in Wireless Sensor Networks", IEEE Transactions on Signal Processing, August 2003, and R. Grossmann et al., "Localization in ZigBee-based Sensor Networks", in IEEE International Symposium on Intelligent Signal Processing WISP 2007, the user is required to place any two nodes at a distance of 1 meter ($d_0$) and to measure the RSSI value between this pair of nodes, before the installation of the location system. This value is used to set the $P_0$ value, whereas $\alpha$ is selected among a series of probable values without however considering the environment and its distinctive features. Having done this, during the estimating of the blind-node positions, these values ($d_0$, $\alpha$, $P_0$) are used to determine the unknown distances between the receivers and the transmitters in the following ranging steps.

However, using the same fixed values for the propagation model parameters during the entire time of measurement entails the introduction of substantial uncertainties in the obtained results. Indeed, due to what has been described above, it may be possible to measure variations in the RSSI values even in the case of fixed nodes, i.e., in the case in which the distances between the transmitters and receivers do not vary. Nevertheless, it may be possible to measure the same RSSI values even if the distances between the nodes are effectively modified.

The "a priori" statistic estimation of the channel model parameters may entail the introduction of substantial errors in the accuracy of the blind-node positions estimations since, due to what has been described above, the RSSI values may vary over time for various factors. In particular, the position-estimation errors may be substantially higher if long time windows are considered for carrying out the measurements.

Conventionally, in order to avoid the timing variability of the RSSI values, they are filtered, for example, discarding the anomalous values such as the spikes, or by applying statistical techniques based on the average calculation.

However, these provisions may be unable to ensure acceptable and stable accuracy levels. In particular, for example, in the case of environments influenced by substantial and various noise sources, conventional location systems may be unable to determine adequate and stable estimations of the positions of the nodes, since the values used for the channel-model parameters remain fixed over time.

SUMMARY

In view of the above, it may be desirable to provide a system and a method for real-time location based on the measurement of RSSI values capable of overcoming these problems. In particular, it may be desirable to provide a system and a method for real-time location capable of improving the accuracy and stability of the level of estimation with respect to conventional systems and methods.

An embodiment concerns real-time location in a wireless network. In particular, an embodiment is based on periodically and automatically determining at least one of the characteristic parameters of the transmission channel model for a wireless network so as to reduce the errors due to the timing variability of said channel and consequently to improve the accuracy of the location estimations.

An embodiment of a method for real-time location in a wireless network includes at least one pair of fixed wireless devices placed in known positions and a mobile wireless device, said method including the following steps:

a) measuring the RSSI value relative to the transmitted signal between said mobile wireless device and each of the fixed wireless devices of said pair of fixed wireless devices;

b) determining the distances between said mobile wireless device and each of the fixed wireless devices of said pair of fixed wireless devices based on a model that describes the trend of the RSSI values relative to the transmitted signal between said mobile wireless device and each of the fixed wireless devices of said pair of fixed wireless devices, as a function of the distance, wherein said model depends upon at least one characteristic parameter of the transmission channel;

c) estimating the position of said mobile wireless device based on said distances determined in step b);

wherein said method also includes the following step:

periodically and automatically determining the value of the characteristic parameter of the transmission channel, based on the known fixed mutual distance between the fixed wireless devices of the pair of fixed wireless devices.

A further embodiment is a method in which the model that describes the trend of the RSSI values relative to the transmitted signal between the mobile wireless device and each of the fixed wireless devices of the pair of fixed wireless devices has the form:

$$RSSI = P_0 - 10\alpha \log_{10}\left(\frac{d}{d_0}\right)$$

in which the first characteristic parameter ($d_0$) of the transmission channel represents a reference distance, the second characteristic parameter ($\alpha$) of the transmission channel represents the attenuation coefficient, the third characteristic parameter ($P_0$) of the transmission channel represents the power received at the reference distance.

A further embodiment is a method in which a characteristic parameter of the transmission channel determined periodically and automatically is the attenuation coefficient ($\alpha$).

According to an embodiment, a method has the following steps:

setting the first characteristic parameter ($d_0$) of the transmission channel representing a reference distance at a predetermined value;

setting the third characteristic parameter ($P_0$) of the transmission channel representing the power received at the reference distance at the value corresponding to the power measured, placing said fixed wireless devices of said pair of fixed wireless devices at the distance corresponding to the preset value for the first parameter ($d_0$).

A further embodiment is a method in which the periodic and automatic determining of the attenuation coefficient ($\alpha$) includes the following sub-steps:

identifying a set of possible values of said attenuation coefficient ($\alpha$);

placing the fixed wireless devices of the pair of fixed wireless devices (marked with indexes i and j) at a known fixed distance $d_{ij}$;

measuring the $RSSI_{ij}$ value relative to the transmitted signal between said fixed wireless devices placed at said known fixed distance $d_{ij}$;

calculating the estimated distance between the fixed wireless devices placed at the known fixed distance $d_{ij}$; wherein said calculation of the estimated distance is carried out based on the expression $$\hat{d}_{i,j} = d_0 \cdot 10^{\frac{P_0 - RSSI_{i,j}}{10\alpha_k}}$$

for every value of the parameter $\alpha_k$ within said set of possible values of said attenuation coefficient ($\alpha$);

selecting the value of $\alpha_k$ that minimizes the error $E_{ij}$ in the estimation of said estimated distance $\hat{d}_{i,j}$ with respect to said known fixed distance $d_{ij}$ as the value of said attenuation coefficient ($\alpha$), according to the expression:

$$E_{i,j} = |\hat{d}_{i,j} - d_{i,j}|.$$

A further embodiment is a method in which the attenuation coefficient ($\alpha$) and the power received at the reference distance ($P_0$) are determined periodically and automatically.

According to a further embodiment, a method includes the following step:

setting the first characteristic parameter of the transmission channel representing a reference distance $d_0$ at a predetermined value.

A further embodiment is a method in which the periodic calculation of the attenuation coefficient ($\alpha$) and of the power received at the reference distance ($P_0$) includes the following steps:

identifying a first set of possible values of said attenuation coefficient ($\alpha$);

identifying a second set of possible values of said power received at the reference distance ($P_0$);

placing said fixed wireless devices of said pair of fixed wireless devices at a known fixed distance $d_{ij}$;

measuring the $RSSI_{ij}$ value relative to the transmitted signal between said fixed wireless devices placed at said known fixed distance $d_{ij}$;

calculating, for every possible value of said power ($P_0$) received at the reference distance within said second set, the estimated distance between said fixed wireless devices placed at said known fixed distance $d_{ij}$; wherein said calculation of the estimated distance is carried out based on the expression $$\hat{d}_{i,j} = d_0 \cdot 10^{\frac{P_0 - RSSI_{i,j}}{10\alpha_k}}$$

for every possible value of the parameter $\alpha_k$ within said first set of possible values of said attenuation coefficient ($\alpha$);

calculating, for every possible value of said power ($P_0$) received at the reference distance within said second set, the first optimization parameter ($E_1(P_0)$) defined as the average of the errors in the estimation of said estimated distance with respect to said known fixed distance as the parameter $\alpha_k$ varies within said first set of possible values of said attenuation coefficient ($\alpha$);

calculating, for every possible value of said power ($P_0$) received at the reference distance within said second set, the second optimization parameter ($E_2(P_0)$) defined as the minimum value of the errors in the estimation of said estimated distance with respect to said known fixed distance as the parameter $\alpha_k$ varies within said first set of possible values of said attenuation coefficient ($\alpha$);

selecting, for every value of said power ($P_0$) received at the reference distance within said second set, the parameter $\alpha_k$ that minimizes said second optimization parameter ($E_2(P_0)$) as minimization parameter $\alpha_{E2}(P_0)$;

calculating, for every possible value of said power ($P_0$) received at the reference distance within said second set, the third optimization parameter ($E_3(P_0)$) defined as the weighted sum of said first optimization parameter ($E_1(P_0)$) and said second optimization parameter ($E_2(P_0)$);

selecting the value of said power ($P_0$) received at the reference distance within said second set that minimizes the value of said third optimization parameter ($E_3(P_0)$);

selecting the corresponding minimization parameter $\alpha_{E2}(P_0)$ as the value of said attenuation coefficient ($\alpha$).

A further embodiment is a method in which said wireless network includes a plurality of pairs of fixed wireless devices.

A further embodiment of a method includes the following steps:

setting the first characteristic parameter ($d_0$) of the transmission channel representing a reference distance at a predetermined value;

setting the third characteristic parameter ($P_0$) of the transmission channel representing the power received at the reference distance at the value corresponding to the power measured, placing the fixed wireless devices of at least one of said plurality of pairs of fixed wireless devices at the distance corresponding to the preset value for the first parameter ($d_0$);

identifying a set of possible values of said attenuation coefficient ($\alpha$);

placing the said fixed wireless devices of said plurality of pairs of fixed wireless devices at known fixed mutual distances $d_{ij}$;

measuring the $RSSI_{ij}$ value relative to the transmitted signal between the two fixed wireless devices placed at said known fixed distance $d_{ij}$ for each pair of said plurality of pairs of fixed wireless devices;

calculating, for each pair of said plurality of pairs of fixed wireless devices, the estimated distance between said fixed wireless devices placed at said known fixed distance $d_{ij}$; wherein said calculation of the estimated distance is carried out based on the expression $$\hat{d}_{i,j} = d_0 \cdot 10^{\frac{P_0 - RSSI_{i,j}}{10\alpha_k}}$$

for every value of the parameter $\alpha_k$ within said set of possible values of said attenuation coefficient ($\alpha$);

calculating, for every value of the parameter $\alpha_k$ within said set of possible values of said attenuation coefficient ($\alpha$), the mean squared error in the estimation of said estimated distance with respect to said known fixed distance ($d_{ij}$) considering all of said pairs of fixed wireless devices;

selecting the value of the parameter $\alpha_k$ that minimizes said mean squared error as the value of said attenuation coefficient ($\alpha$).

According to a further embodiment, a method includes the following steps:

setting the first characteristic parameter ($d_0$) of the transmission channel representing a reference distance at a predetermined value;

identifying a first set of possible values of said attenuation coefficient ($\alpha$);

identifying a second set of possible values of said power received at the reference distance ($P_0$);

placing said fixed wireless devices of said plurality of pairs of fixed wireless devices at known fixed mutual distances $d_{ij}$;

measuring the $RSSI_{ij}$ value relative to the transmitted signal between said fixed wireless devices placed at said known fixed mutual distances $d_{ij}$;

calculating, for every possible value of said power ($P_0$) received at the reference distance within said second set, the estimated distance between said fixed wireless devices placed at said known fixed distances; wherein said calculation of the estimated distance is carried out based on the expression $$\hat{d}_{i,j} = d_0 \cdot 10^{\frac{P_0 - RSSI_{i,j}}{10\alpha_k}}$$

for every possible value of the parameter $\alpha_k$ within said first set of possible values of said attenuation coefficient ($\alpha$);

calculating, for every value of the parameter $\alpha_k$ within said first set of possible values of said attenuation coefficient ($\alpha$), the root mean squared error in the estimation of said estimated distance with respect to said known fixed distance $d_{ij}$ considering all of said pairs of fixed wireless devices;

calculating, for every possible value of said power ($P_0$) received at the reference distance within said second set, the first optimization parameter ($E_1(P_0)$) defined as the average of said root mean squared error;

calculating, for every possible value of said power ($P_0$) received at the reference distance within said second set, the second optimization parameter ($E_2(P_0)$) defined as the minimum value among the values of said root mean squared error;

selecting, for every possible value of said power ($P_0$) received at the reference distance within said second set, the parameter $\alpha_k$ that minimizes said second optimization parameter ($E_2(P_0)$) as minimization parameter $\alpha_{E2}(P_0)$;

calculating, for every possible value of said power ($P_0$) received at the reference distance within said second set, the third optimization parameter ($E_3(P_0)$) defined as the weighted sum of said first optimization parameter ($E_1(P_0)$) and said second optimization parameter ($E_2(P_0)$);

selecting the value of said power ($P_0$) received at the reference distance within said second set that minimizes the value of said third optimization parameter ($E_3(P_0)$) as the value of said power ($P_0$) received at the reference distance ($P_0$);

selecting the corresponding minimization parameter $\alpha_{E2}(P_0)$ as the value of said attenuation coefficient ($\alpha$).

A further embodiment is a method in which the periodic determination of said characteristic parameter of the transmission channel occurs at least every 10 minutes. This may allow improving the accuracy in the mobile wireless device position estimation in environments characterized by high timing variance of the transmission channel.

A further embodiment is a method in which the wireless network includes a plurality of mobile wireless devices and the method also includes the following step: repeating steps a), b) and c) for each of the mobile wireless devices of the plurality of mobile wireless devices.

A further embodiment is a method in which the wireless network is an IEEE 802.15.4 network.

A further embodiment is a real-time location system in a wireless network that is suitable for carrying out a method according to an embodiment.

A further embodiment is a system including at least 3 fixed wireless devices and at least one mobile wireless device. In this way the system includes at least 3 possible pairs of fixed wireless devices that are placed at fixed mutual distances that are known a priori, allowing the use of position estimation schemes of the mobile node, like for example lateration.

A further embodiment is a system that includes a coordinator device suitable for managing the operations of a wireless network.

A further embodiment is a network of wireless sensors including an embodiment of a real-time location system.

BRIEF DESCRIPTION OF THE DRAWINGS

FIG. 1B is a table with the results of an algorithm executed according to an embodiment with respect to the configuration shown in FIG. 1A;

FIG. 2B is a table with the results of an algorithm according to an embodiment with respect to the configuration shown in FIG. 2A;

FIG. 2C is a table with the results of an algorithm according to another embodiment with respect to the configuration shown in FIG. 2A.

DETAILED DESCRIPTION

Figure 1A:
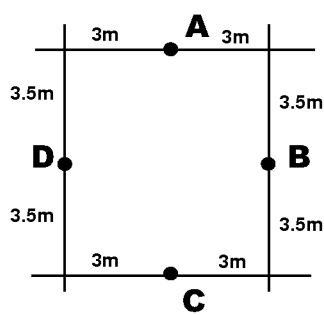
FIG. 1A is a diagram of the displacement of 4 anchors used to carry out a static calibration according to an embodiment.

Hereafter, one or more embodiments are described. However, the concepts discussed in the present disclosure are not limited to the particular embodiment(s) described in the following detailed description.

For example, at least some of the experimental results shown in the figures are relative to the ZigBee SN 250 platform of STMicroelectronics, which platform is compliant with the specifications defined by the standard IEEE 802.15.4 and, in particular, with respect to the radio frequencies in the band at 2.4 GHz. However, embodiments are not limited to this specific platform and to this band of frequencies. Moreover, even if the experimental results shown hereafter are relative to a location indoors, an embodiment may also be used for outdoor location. In particular, therefore, further modifications and variations of the one or more embodiments disclosed herein are contemplated. Consequently, the present disclosure is to be considered as including all such modifications and variations.

Corresponding elements may be indicated, for the sake of simplicity, in the figures with similar references numerals and/or symbols.

Based on an embodiment, in order to estimate the distances from the RSSI measurements in an indoor environment, a model is implemented that represents the decay of power of RF signals in such an environment based on the equation (6) indicated above:

$$\overline{RSSI} = P_0 - 10\alpha\log_{10}\left(\frac{d}{d_0}\right) \qquad (6)$$

where $\overline{RSSI}$ is the average RSSI value measured at the distance d.

As described previously, the power decay of a signal from the transmitter node to the receiver node, according to this model, depends on three parameters:

the reference distance $d_0$;

the attenuation coefficient $\alpha$ that depends on the type of channel in which the signal propagates;

the value $P_0$ of the power received at the reference distance $d_0$.

Based on an embodiment, a may, for example, take values between approximately 1.0 and 4, whereas $P_0$ may for example take values between −50 dBm and −35 dBm. However, an embodiment is not limited to these values. For example, the value of $P_0$ depends on the transmitted power $P_T$ and, therefore, as $P_T$ varies there may be suitable ranges of variation of $P_0$.

The determining of the three parameters ($P_0$, $d_0$, a), characterizing the channel model that is represented by equation (6), is indicated as "calibration".

In an embodiment, at least one of the parameters that describe the channel model is determined periodically and automatically, and thus it is used from one time to the next to obtain the mutual distances among the nodes.

Hereafter we shall describe an embodiment indicated as "static calibration". Based on this embodiment, the parameter α (attenuation coefficient) is determined periodically and automatically, exploiting the knowledge a priori of the position of the fixed anchor nodes and thus their mutual distance.

Firstly, based on this embodiment, in order to reduce the number of parameters to be determined to two, it may be possible to set the reference distance $d_0$ to a predetermined value, for example 1 meter. So, determining only the pair of parameters $P_0$ and a determines the calibration.

Before the network installation, two nodes are placed at the previous set distance $d_0$: the mean RSSI value measured by an exchange of packets between the two nodes constitutes the parameter $P_0$ that thus remains fixed for the entire duration of the measurement.

In order to be able to select from one time to the next the best value of α for an interesting scenario, the anchors are suitably positioned and configured with the relative coordinates; therefore, knowing the coordinates ($x_i$, $y_i$) and ($x_j$, $y_j$) of two anchors i and j, the Euclidean mutual distance $d_{i,j}$ is calculated with the known formula:

$$d_{i,j} = \sqrt{(x_i - x_j)^2 + (y_i - y_j)^2} \qquad (7)$$

The equation (7) refers to a two-dimensional system, i.e., a system in which all of the anchors are placed at approximately the same height from the ground. Despite this, the present embodiment is not limited to systems in which all of the anchors are placed at the same height from the ground. In particular, in cases in which one or more anchors are placed at a different height with respect to the other anchors of the system, one may generalize the problem to the system of three-dimensional coordinates in which the coordinates of two anchors i and j are given by ($x_i$, $y_i$, $z_i$) and ($x_j$, $y_j$, $z_j$) and the Euclidean distance is given by:

$$d_{i,j} = \sqrt{(x_i - x_j)^2 + (y_i - y_j)^2 + (z_i - z_j)^2} \qquad (7')$$

At this point, every pair of anchors (i, j) measures the value of $\overline{RSSI_{i,j}}$, through the exchange of suitable packets. In other words, $\overline{RSSI_{i,j}}$ represents the mean RSSI value measured by the anchor "j" with respect to the signal sent by the anchor "i" or vice-versa.

Thus, let us consider a predetermined and realistic set of values for the parameter α. For example, let us consider α within the range from $α_I=1.0$ to $α_F=4.0$. In particular, for the parameter α let us consider all of the values $α_K$ within the range from $α_I$ to $α_F$ considering a certain step pα (for example pα=0.1). In other words, let us consider that a takes all the values of the set A={$α_I$, $α_I$+pα, $α_I$+2 pα, ..., $α_F$−2pα, $α_F$−pα, $α_F$}. Based on the present embodiment, various sets A of possible values may be considered for the parameter α and there are no particular requirements either for the extremes of the set or for the step. Alternatively, sets may be considered in which the values are not separated by a fixed step, but for example they may be randomly distributed.

For every value $α_k$ within the set A, and for every pair of anchor nodes (i, j) an estimated distance $\hat{d}_{i,j}$ between the 2 nodes is calculated according to the formula:

$$\hat{d}_{i,j} = d_0 \cdot 10^{\frac{P_0 - RSSI_{i,j}}{10 α_k}}. \qquad (8)$$

For every value $α_k$, it is thus possible to determine the absolute error in the distance estimation for each link i-j through the formula:

$$\text{Err}(α_k)_{(i,j)} = |(\hat{d}_{i,j} - d_{i,j})| \qquad (9)$$

This value represents the absolute error that would be obtained if the distance between the nodes (i, j) were determined selecting the parameters ($d_0$, $P_0$, $α_k$).

The mean squared error $\overline{\text{Err}^2}(α_k)$ is thus defined as the mean value of the errors over all the links between the anchors of the system for every $α_k$ within the set A:

$$\overline{\text{Err}^2}(α_k) = \underset{(i,j)}{Avg}\{[Err(α_k)_{(i,j)}]^2\} \qquad (10)$$

Thus, the attenuation factor α is selected as the value that minimizes $\overline{\text{Err}^2}(α_k)$, i.e.,:

$$α = \arg\underset{α_k}{\min}\overline{\text{Err}^2}(α_k) \qquad (11)$$

FIGS. 1A and 1B schematically show an example of experimental application of the algorithm described with respect to the "static calibration".

In particular, FIG. 1A schematically shows the displacement of 4 anchors indicated with A, B, C, and D used for the execution of the algorithm. The indicated distances are expressed in meters. The 4 anchor nodes, seen from above in the figures, are placed at the same height from the ground (for example 2 m) so as to be able to consider the system two-dimensional for the sake of simplicity. Despite this, based on the present embodiment, the anchor nodes may also be placed at different heights, and the system may be treated from the three-dimensional point of view also considering the z coordinate relative to the height of the anchors with respect to the ground.

At the beginning of the static calibration process, the parameter $d_0$ is fixed at 1 meter and then $P_0$ is measured and set at −42 dBm.

Then the algorithm is applied as described above and FIG. 1B shows the table of the results obtained.

For each of the six possible pairs (links) of anchors, the values in meters of the Euclidean distance d between the two anchors and the mean RSSI values measured are indicated in the table.

Moreover, as $α_k$ varies from 1.0 to 4.0 with a step equal to 0.1 (first column on the left), for each pair of anchors the value of the estimated distance (Est. Dist.) by means of the equation (8) and the relative value of the absolute error (Est. Err.) calculated through the equation (9) are indicated.

Finally, the last column on the right indicates, as $α_k$ varies from 1.0 to 4.0 with a step equal to 0.1, the value of the mean squared error (AVG(Err$^2$)) calculated through the equation (10) considering all the six pairs of anchors.

As may be seen in the table, the mean squared error takes a minimum value equal to 0.78 for $α_k$=1.7.

In this case, therefore, the equation (11) gives $α_k$=1.7. Then, the distance estimations may be executed considering the equation (6) adopting the three parameters ($P_0$, $d_0$, α)=(−42 dBm, 1 m, 1.7).

At this point, indeed, having determined the values of $P_0$, $d_0$, $\alpha$, the subsequent steps of the location method may be performed. In particular, for example, the ranging-measurements phase for distance estimation among the blind nodes and the anchor nodes by means of the inverse formula of the equation (6) and the lateration phase to determine the blind nodes Euclidean coordinates may be executed.

In order to deal with the timing variability of the channel, the estimation of the $\alpha$ attenuation coefficient, as described above, may be performed periodically.

For example, the periodic determining of the parameter $\alpha$ may be executed with a frequency that depends on the type of environment. For example, in indoor environments characterized by a high timing variability of the parameter $\alpha$, this parameter may be determined at intervals of the order of tens of minutes. In outdoor environments or in any case environments characterized by a reduced timing variability of the parameter $\alpha$, this parameter may be determined at intervals of the order of an hour. However, the timing indications given here are not to be considered restrictive.

The embodiment described above includes a manual configuration step. In particular, the value of the parameter $P_0$ is determined by measuring the RSSI value for two nodes placed at the predetermined distance $d_0$, and it is not updated during the entire series of measurements.

Hereafter is described an embodiment indicated as "dynamic calibration". In particular, based on this embodiment, both of the parameters $\alpha$ (attenuation coefficient) and $P_0$ (value of the power received at the reference distance) are determined periodically through an exchange of messages between the anchors.

Firstly, based on this embodiment, in order to reduce to two the number of parameters to be determined, it may be possible to set the reference distance $d_0$ at a preset value, for example 1 meter. So, only the pair of parameters $P_0$ and $\alpha$ are calculated to determine the calibration.

Thus, let us consider ranges of predetermined and realistic values for the parameters $P_0$ and $\alpha$. In particular, let us consider for example $P_0$ within the range from $P_{0I}=-50$ dBm to $P_{0F}=-35$ dBm. Moreover, let us consider for example $\alpha$ within the range from $\alpha_I=1.0$ to $\alpha_F=4.0$.

The mean error value is calculated as described with respect to the embodiment indicated as "static calibration" (equations (7) to (10)) for each value of $P_0$ within the predetermined range from $P_{0I}$ to $P_{0F}$ considering a determined step $pP_0$ (for example $pP_0=1$ dBm) and for each value of $\alpha$ within the range from $\alpha_I$ to $\alpha_F$ considering a determined step $p\alpha$ (for example $p\alpha=0.1$).

Practically, let us consider that $P_0$ takes all the values of the set $B=\{P_{0I}, P_{0I}+pP_0, P_{0I}+2pP_0, P_{0F}-2pP_0, P_{0F}-pP_0, P_{0F}\}$. Moreover, let us consider that $\alpha$ takes all the values of the set $A=\{\alpha_I, \alpha_I+p\alpha, \alpha_I+2\,p\alpha, \ldots, \alpha_F-2p\alpha, \alpha_F-p\alpha, \alpha_F\}$.

Based on the present embodiment, various sets of possible values may be considered for both the parameters $\alpha$ (set A) and $P_0$ (set B) and there are no particular requirements either for the extremes of the two sets or for the value steps. Moreover, sets A and/or B may be considered in which the values are not separated by a fixed step, but, for example, they may be randomly distributed.

For every value of $P_0$ of the set B we shall consider every value of $\alpha$ of the set A and we shall calculate the mean error value $\overline{Err^2}$ as described with respect to the embodiment indicated as "static calibration" (equations (7) to (10)). We shall thus consider the following parameters:

the parameter $E_1$ defined as the root mean of the values of the mean squared errors defined by the formula (10) considering $\alpha$ within the set A:

$$E_1(P_0) = \underset{(\alpha_k)}{Avg}\left(\sqrt{\overline{Err^2}(\alpha_k)}\right) \quad (12)$$

In practice, each value of $P_0$ in the set B corresponds to a value of the parameter $E_1$.

The parameter $E_2$ defined as the minimum mean squared error of the distances between anchors:

$$E_2(P_0) = \min_{\alpha_k} \sqrt{\overline{Err^2}(\alpha_k)} \quad (13)$$

Also in this case, each value of $P_0$ in the set B corresponds to a value of the parameter $E_2$.

Thus, the value of $\alpha_{E2}$ may be identified such as the $\alpha$ value that actually leads to such an error $E_2(P_0)$. In this way for each value of $P_0$ the relative $\alpha_{E2}$ value is identified such that:

$$\alpha_{E2}(P_0) = \arg\min_{\alpha_k} E2(P_0) \quad (14)$$

The purpose is to select one of the pairs $(P_0, \alpha_{E2})$ that fits the channel model of the system in the best possible way.

In order to obtain a single index that considers both the $\alpha$ value, minimizing the error between the anchors ($E_2$), and the mean squared error relative to the value of $P_0$ that is being considered ($E_1$), the parameter $E_3$ is used, defined as the weighted sum of indices $E_1$ and $E_2$, respectively, to estimate the error of the distance that there would be selecting $P_0$ and the value $\alpha_{E2}$ that minimizes the mean squared error $E_2$ for that determined value of $P_0$:

$$E_3 = w_{E1} \cdot E_1 + w_{E2} \cdot E_2 \quad (15)$$

with $w_{E1} < w_{E2}$.

In the expression (15) the weight $w_{E1}$ assigned to the metric $E_1$ typically has a value lower than the weight $w_{E2}$ assigned to the metric $E_2$ since, whereas the metric $E_1$ represents an average of the mean squared error of the estimated distances between all of the anchors over all of the $\alpha_k$ possible values for every given value of $P_0$, the metric $E_2$ actually represents the minimum of such errors for every given value of $P_0$, and, therefore, it is the minimum error that is tended towards (i.e., has the most weight) in the selection of the pair $(P_0, \alpha)$. On the other hand, considering just $E_2$, there may be the risk of considering value relative to the spikes, possibly resulting in a non-optimal selection of $P_0$ that may be verified from the metric $E_1$. Therefore, a weight that is lower, but still not negligible compared to the weight of $E_2$ is assigned to $E_1$, in order to balance the effects of the two indexes.

For example, in indoor environments with very large spaces, it is possible to consider:

$$E_3 = 0.25 E_1 + 0.75 E_2 \quad (16)$$

In general, an optimal selection of the value of the two weights may not differ much from the one proposed in this specific case.

Practically, in an embodiment, the channel parameters are selected considering, the value of $P_0$ that minimizes the index $E_3$ and the attenuation coefficient $\alpha$ that minimizes the mean squared error $E_2$ for that determined value of $P_0$ ($\alpha_{E2}(P_0)$).

Figure 2A:
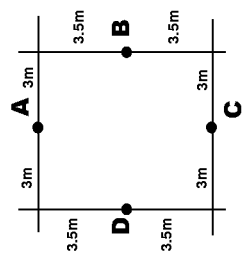
FIG. 2A is a diagram of the displacement of 4 anchors used to carry out a dynamic calibration according to an embodiment.

FIGS. 2A, 2B and 2C show an example of experimental application of the algorithm described with respect to the "dynamic calibration".

In particular, FIG. 2A shows the displacement of 4 anchor nodes indicated with A, B, C, and D used for the execution of the algorithm. The indicated distances are expressed in meters. The 4 anchor nodes, seen from above in the figures, are placed at the same height of 2 m from the ground so to be able to consider the system two-dimensional for the sake of simplicity. Despite this, based on the present embodiment, the anchor nodes may also be placed at different heights, and the system may be treated from the three-dimensional point of view also considering the z coordinate relative to the height of the anchors with respect to the ground.

At the beginning of the dynamic calibration process the parameter $d_0$ is fixed at 1 meter. Also, the range from −47 dBm to −35 dBm for the parameter $P_0$ with a step of 1 dBm and the range from 1.0 to 4.0 for the parameter $\alpha$ with a step of 0.1 are selected.

Then the algorithm is applied as described above, and FIG. 2B shows the table of the results obtained with $P_0$=−42 dBm.

For each of the six possible pairs (links) of anchors, the values in meters of the Euclidean distance d between the two anchors and the mean RSSI values measured are indicated in the table.

Moreover, as $\alpha_k$ varies from 1.0 to 4.0 with a step equal to 0.1 (first column on the left), for each pair of anchors the value of the estimated distance (Est. Dist.) by means of the equation (8) and the relative value of the absolute error (Est. Err.) calculated with the equation (9) are indicated.

Finally, the last column on the right indicates, as $\alpha_k$ varies from 1.0 to 4.0 with a step equal to 0.1, the value of the root mean squared error (SQRT(AVG(Err$^2$))) calculated through the equation (10) considering all the six pairs of anchors.

The mean of these values, i.e., the mean value of the values indicated in the last column on the right in the table, represents the $E_1$ parameter value for the selected $P_0$ value, i.e., for $P_0$=−42 dBm. In particular, through the equation (12), in this case:

$$E_1(-42\ dBm)=3.35.$$

The minimum of these values, i.e., the minimum of the values indicated in the column on the right in the table, represents the $E_2$ parameter value for the selected $P_0$ value, i.e., for $P_0$=−42 dBm. In particular, through the equation (13), in this case:

$$E_2(-42\ dBm)=0.89.$$

The $\alpha$ value corresponding to this minimum value $E_2$, is the value for $\alpha_{E2}$ with this selected $P_0$ value, i.e., for $P_0$=−42 dBm. In particular, through the expression (14), in this case:

$$\alpha_{E2}(-42\ dBm)=1.7.$$

This process is repeated for each $P_0$ value within the selected range, i.e., for $P_0$ from −47 dBm to −35 dBm with a step of 1 dBm, and the results are indicated in the table shown in FIG. 2C.

The table also considers the values of the metrics E1, E2, and $E_3$ as $P_O$ varies considering the expressions (12), (13), (14) and (16), i.e., selecting the weights of 25% and 75% for $E_1$ and $E_2$, respectively.

Thus, the minimum value of the parameter $E_3$ is considered for selecting the optimal values of $P_0$ and $\alpha$ which are adopted in the location system for estimation of the equation (6).

In particular, as may be seen in FIG. 2C, the minimum value of $E_3$ is equal to 1.46 and corresponds to $P_0$=−44 dBm and $\alpha$=1.4. The set of three parameters to be used in the equation (6) is thus: $(P_0, d_0, \alpha)$=(−44 dBm, 1 m, 1.4).

At this point, having determined the values of $d_0$, $P_0$ and $\alpha$, the subsequent steps of the location method may be executed. In particular, for example, the ranging-measurement phase for distance estimation among the blind nodes and the anchor nodes by means of the inverse formula of the equation (6) and the lateration phase to determine the blind nodes Euclidean coordinates may be performed.

In order to deal with the timing variability of the channel, the estimation of the $\alpha$ attenuation coefficient and of $P_0$ power received at the reference distance, as described above, may be executed periodically and automatically.

In particular, for example, the periodic determining of the parameter $\alpha$ and $P_0$ may be executed with a frequency that depends on the type of environment. For example, in indoor environments characterized by a high timing variability of the parameters $\alpha$ and $P_0$, the values of these parameters may be determined at intervals of the order of tens of minutes. In outdoor environments or in any case environments characterized by a reduced timing variability of the parameters $\alpha$ and $P_0$, the values of these parameters may be determined at intervals of the order of an hour. However, the timing indications given here are not to be considered restrictive.

In a particular embodiment, the system may be suitable for determining the coordinates of at least one of the blind nodes also in the case in which said node is not able to receive signals from at least 3 anchors. In particular, if the blind node receives the signal only from a single anchor, the system may be suitable for assigning to the blind node the coordinates of such an anchor, without any distance estimation. If the blind node receives the signal only from two anchors, the system may be able to assign to the blind node the coordinates of the intermediate position between the two points of intersection of the circumferences centered in the position of the two anchors and having a radius equal to the estimation of the distances from the same anchors to the blind node, said estimation being executed using the determined parameters of the channel ($d_0$, $P_0$, $\alpha$) with according to one of the described calibration embodiments. If the blind node receives the signal from 3 or more anchors, then the system may be able to assign to the blind node the coordinates of the position deriving from lateration.

The nodes may be placed at different heights with respect to the ground, for example at heights of 1 m, 2 m or greater heights. In particular, the nodes may be arranged at a height equal to or greater than the height of people moving inside an environment to be monitored.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A real-time location method in a wireless network comprising at least one pair of fixed wireless devices placed in known positions and at least one mobile wireless device, said method comprising: a) measuring the RSSI (Received Signal Strength Indication) value relative to the transmitted signal between said at least one mobile wireless device and each of the fixed wireless devices of said pair of fixed wireless devices; b) determining the distances between said at least one mobile wireless device and each of the fixed wireless devices of said pair of fixed wireless devices based on a model that describes the relation of the RSSI value relative to the transmitted signal between said at least one mobile wireless device and each of the fixed wireless devices of said pair of fixed wireless devices as a function of the distance, wherein said model depends upon at least one characteristic parameter of the transmission channel; c) estimating the position of said at least one mobile wireless device based on said distances determined in said step b); d) periodically and automatically determining said characteristic parameter of the transmission channel, based on the known fixed mutual distances ($d_{ij}$) between the fixed wireless devices of said pair of fixed wireless devices.

2. Method according to claim 1, wherein said model that describes the relation of the RSSI value relative to the transmitted signal between said at least one mobile wireless device and each of the fixed wireless devices of said pair of fixed wireless devices has the form:

$$RSSI = P_0 - 10\alpha \log_{10}\left(\frac{d}{d_0}\right)$$

wherein the first characteristic parameter $d_0$ of the transmission channel represents a reference distance, the second characteristic parameter $\alpha$ of the transmission channel represents the attenuation coefficient, and the third characteristic parameter $P_0$ of the transmission channel represents the power received at the reference distance.

3. Method according to claim 2, wherein the characteristic parameter of the transmission channel determined periodically is the attenuation coefficient $\alpha$.

4. Method according to claim 2, further comprising: a) setting the first characteristic parameter $d_0$ of the transmission channel representing a reference distance to a predetermined value; b) setting the third characteristic parameter $P_0$ of the transmission channel representing the power received at the reference distance to a value corresponding to the power measured placing said fixed wireless devices of said pair of fixed wireless devices at a distance corresponding to the preset value for the first parameter $d_0$.

5. Method according to claim 4, wherein the periodic determination of said attenuation coefficient $\alpha$ comprises: a) setting a set of possible values of said attenuation coefficient $\alpha$; b) placing said fixed wireless devices of said pair of fixed wireless devices at a known fixed distance ($d_{ij}$); c) measuring the RSSI value ($RSSI_{i,j}$) relative to the transmitted signal between said fixed wireless devices arranged at said known fixed distance ($d_{ij}$); d) calculating the ($\hat{d}_{i,j}$) distance estimation $\hat{d}_{i,j}$ between said fixed wireless devices placed at said known fixed distance ($d_{i,j}$); wherein said calculation of the distance estimation is executed by the expression $$\hat{d}_{i,j} = d_0 \cdot 10 \cdot \frac{P_0 - RSSI_{i,j}}{10\alpha_k}$$

for every value of the parameter $\alpha_k$ within said set of possible values of said attenuation coefficient $\alpha$; e) selecting the value of the parameter $\alpha_k$ that minimizes the error in the estimation of said estimated distance ($\hat{d}_{i,j}$) with respect to said known fixed distance ($d_{i,j}$) as the value of said attenuation coefficient $\alpha$.

6. Method according to claim 2, wherein the attenuation coefficient $\alpha$ and the power received at the reference distance $P_0$ are determined periodically and automatically.

7. Method according to claim 6, further comprising: setting the value of the first characteristic parameter $d_0$ of the transmission channel representing a reference distance at a predetermined value.

8. Method according to claim 7, wherein the periodic and automatic calculation of said attenuation coefficient $\alpha$ and of said power $P_0$ received at the reference distance comprises the following steps: a) setting a first set of possible values of said attenuation coefficient $\alpha$; b) setting a second set of possible values of said power received at the reference distance $P_0$; c) placing said fixed wireless devices of said pair of fixed wireless devices at a known fixed distance ($d_{i,j}$); d) measuring the RSSI value ($RSSI_{i,j}$) relative to the transmitted signal between said fixed wireless devices arranged at said known fixed distance ($d_{i,j}$); e) calculating, for every value of said power $P_0$ received at the reference distance within said second set, the estimated distance ($\hat{d}_{i,j}$) between said fixed wireless devices placed at said known fixed distance ($d_{i,j}$); wherein said calculation of distance estimation is performed through the expression $$\hat{d}_{i,j} = d_0 \cdot 10 \cdot \frac{P_0 - RSSI_{i,j}}{10\alpha_k}$$

for every value of the parameter $\alpha_k$ within said first set of possible values of said attenuation coefficient $\alpha$; e) calculating, for every value of said power received at the reference distance within said second set, the first optimization parameter ($E_1(P_0)$) as the average of the errors in the estimation of said estimated distance ($\hat{d}_{i,j}$) with respect to said known fixed distance ($d_{i,j}$) as the parameter $\alpha_k$ varies within said first set of possible values of said attenuation coefficient $\alpha$; f) calculating, for every value of said power $P_0$ received at the reference distance within said second set, the second optimization parameter ($E_2(P_0)$) as the minimum value of the errors in the estimation of said estimated distance ($\hat{d}_{i,j}$) with respect to said known fixed distance ($d_{i,j}$) as the parameter $\alpha_k$ varies within said first set of possible values of said attenuation coefficient $\alpha$; g) selecting, for every value of said power received at the reference distance within said second set, the parameter $\alpha_k$ that minimizes said second optimization parameter ($E_2(P_0)$) as minimization parameter $\alpha_{E2}(P_0)$; h) calculating, for every value of said power $P_0$ received at the reference distance within said second set, the third optimization parameter ($E_3(P_0)$) as the weighted sum of said first optimisation parameter ($E_1(P_0)$) and said second optimisation parameter ($E_2(P_0)$); i) selecting the value of said power $P_0$ received at the reference distance within said second set that minimises the value of said third optimisation parameter ($E_3(P_0)$) as the value of said power $P_0$ received at the reference distance; j) selecting the corresponding minimisation parameter $\alpha_{E2}(P_0)$ as the value of said attenuation coefficient $\alpha$.

9. Method according to claim 1, wherein said wireless network comprises a plurality of pairs of fixed wireless devices (A, B, C, D).

10. Method according to claim 7, further comprising the following steps: a) setting the first characteristic parameter $d_0$ of the transmission channel representing a reference distance at a predetermined value; b) setting the third characteristic parameter $P_0$ of the transmission channel representing the power received at the reference distance to a value corresponding to the power measured placing the fixed wireless devices of at least one of said plurality of pairs of fixed wireless devices at a distance corresponding to the predetermined value for the first parameter $d_0$; c) setting a set of possible values of said attenuation coefficient α; d) placing said fixed wireless devices of said plurality of pairs of fixed wireless devices at a known fixed distance ($d_{i,j}$); e) measuring the RSSI value ($RSSI_{i,j}$) relative to the transmitted signal between the two fixed wireless devices arranged at said known fixed distance ($d_{i,j}$) for each pair of said plurality of pairs of fixed wireless devices; f) calculating, for each pair of said plurality of pairs of fixed wireless devices, the estimated distance ($\hat{d}_{i,j}$) between said fixed wireless devices arranged at said known fixed distance ($d_{i,j}$); wherein said calculation of the distance estimation is performed through the expression $$\hat{d}_{i,j} = d_0 \cdot 10 \cdot \frac{P_0 - RSSI_{i,j}}{10\alpha_k}$$

for every value of the parameter $\alpha_k$ within said set of possible values of said attenuation coefficient α; g) calculating, for every value of the parameter $\alpha_k$ within said set of possible values of said attenuation coefficient α, the mean squared error in the estimation of said estimated distance ($\hat{d}_{i,j}$) with respect to said known fixed distance ($d_{i,j}$) considering all of said pairs of fixed wireless devices; h) selecting the value of the parameter $\alpha_k$ that minimizes said mean squared error as the value of said attenuation coefficient α.

11. Method according to claim 9, further comprising: a) setting the value of the first characteristic parameter ($d_0$) of the transmission channel representing a reference distance at a predetermined value; b) setting a first set of possible values of said attenuation coefficient (α); c) setting a second set of possible values of said power received at the reference distance ($P_0$); d) placing said fixed wireless devices of said plurality of pairs of fixed wireless devices at known fixed mutual distances ($d_{i,j}$); e) measuring the RSSI value ($RSSI_{i,j}$) relative to the transmitted signal between said fixed wireless devices arranged at said known fixed mutual distances ($d_{i,j}$); f) calculating, for every value of said power ($P_0$) received at the reference distance within said second set, the estimated distance ($\hat{d}_{i,j}$) between said fixed wireless devices placed at said known fixed distance ($d_{i,j}$); wherein said calculation of the distance estimation is performed through the expression $$\hat{d}_{i,j} = d_0 \cdot 10 \cdot \frac{P_0 - RSSI_{i,j}}{10\alpha_k}$$

for every value of the parameter $\alpha_k$ within said first set of possible values of said attenuation coefficient (α); g) calculating, for every value of the parameter $\alpha_k$ within said first set of possible values of said attenuation coefficient (α), the root mean squared error in the estimation of said estimated distance ($\hat{d}_{i,j}$) with respect to said known fixed distance ($d_{i,j}$) considering all of said pairs of fixed wireless devices; h) calculating, for every value of said power ($P_0$) received at the reference distance within said second set, the first optimisation parameter ($E_1(P_0)$) as the average of said root mean squared error; i) calculating, for every value of said power ($P_0$) received at the reference distance within said second set, the second optimisation parameter ($E_2(P_0)$) as the minimum value among the values of said root mean squared error; j) selecting, for every value of said power ($P_0$) received at the reference distance within said second set, the parameter $\alpha_k$ that minimises said second optimisation parameter ($E_2(P_0)$) as minimisation parameter $\alpha_{E2}(P_0)$; k) calculating, for every value of said power ($P_0$) received at the reference distance within said second set, the third optimisation parameter ($E_3(P_0)$) as the weighted sum of said first optimisation parameter ($E_1(P_0)$) and said second optimisation parameter ($E_2(P_0)$); l) selecting the value of said power ($P_0$) received at the reference distance within said second set that minimises the value of said third optimisation parameter ($E_3(P_0)$) as the value of said power ($P_0$) received at the reference distance; m) selecting the corresponding minimisation parameter $\alpha_{E2}(P_0)$ as the value of said attenuation coefficient (α).

12. Method according to claim 1, wherein said periodic and automatic determining of said characteristic parameter of the transmission channel occurs at least every 10 minutes.

13. Method according to claim 1, wherein said wireless network comprises a plurality of wireless devices, said method also comprising the following step: repeating said steps a), b) and c) for each of the mobile wireless devices of said plurality of mobile wireless devices.

14. Method according to claim 1, wherein said wireless network is an IEEE 802.15.4 network.

15. An apparatus, comprising:
a determiner configurable to determine a value of a first term of an expression that relates a characteristic of a signal to a distance from a transmitter of the signal, the determiner configured to determine the value in response to
a first level of the characteristic for a first signal between first and second nodes,
a first distance between the first and second nodes,
a second level of the characteristic for a second signal between third and fourth nodes, and
a second distance between the third and fourth nodes; and
a calculator configurable to calculate a distance of a fifth node from one of the first, second, third, and fourth nodes in response to the value of the term.

16. The apparatus of claim 15 wherein the term of the expression includes an attenuation coefficient.

17. The apparatus of claim 15 wherein the characteristic includes an indication of a strength of a signal at a receiver.

18. The apparatus of claim 15 wherein the calculator is configurable to calculate respective distances of the fifth node from more than one of the first, second, third, and fourth nodes in response to the value of the term.

19. The apparatus of claim 15 wherein the calculator is configurable to calculate a location of the fifth node from the distance.

20. The apparatus of claim 15 wherein the calculator is configurable to calculate the distance of the fifth node from one of the first, second, third, and fourth nodes in response to a third level of the characteristic for a signal between the fifth node and the one of the first, second, third, and fourth nodes.

21. The apparatus of claim 15, further comprising a receiver coupled to the determiner and configurable:
to receive the first level of the signal characteristic; and
to receive the second level of the signal characteristic.

22. The apparatus of claim 15 wherein:
the determiner is configurable to determine a value of a second term of the expression in response to
the first level of the characteristic,
the first distance,
the second level of the characteristic, and
the second distance; and
the calculator is configurable to calculate the distance of the fifth node from one of the first, second, third, and fourth nodes in response to the value of the second term.

23. A system, comprising:
first and second nodes separated by a first distance and configurable to communicate via a first signal having a first level of a characteristic;
third and fourth nodes separated by a second distance and configurable to communicate via a second signal having a second level of the characteristic;
a fifth node separated from the first, second, third, and fourth nodes;
an apparatus, including
a determiner configurable to determine a value of a term of an expression that relates the characteristic to a distance between a node that transmits a signal and a node that receives the signal, the determiner configurable to determine the value in response to
the first and second levels of the characteristic, and
the first and second distances, and
a calculator configurable to calculate a distance of the fifth node from one of the first, second, third, and fourth nodes in response to the value of the term.

24. The system of claim 23 wherein one of the first and second nodes and one of the third and fourth nodes are a same node.

25. The system of claim 23 wherein the apparatus is separated from the first, second, third, fourth, and fifth nodes.

26. The system of claim 23 wherein the apparatus is disposed on one of the first, second, third, fourth, and fifth nodes.

27. The system of claim 23 wherein the apparatus includes a processor that is configurable to implement the determiner and the calculator.

28. The system of claim 23 wherein the apparatus includes hardware that is configurable to implement the determiner and the calculator.

29. A method, comprising:
determining a value of a first term of an expression in response to a first level of a characteristic for a first signal between first and second locations, a first distance between the first and second locations, a second level of the characteristic for a second signal between third and fourth locations, and a second distance between the third and fourth locations; and
finding a first distance of a fifth location from one of the first, second, third, and fourth locations in response to the determined value.

30. The method of claim 29 wherein the characteristic is a function of signal-propagation distance.

31. The method of claim 29 wherein one of the first and second nodes is also one of the third and fourth nodes.

32. The method of claim 29, further including finding a second distance of the fifth location from another of the first, second, third, and fourth locations in response to the value of the term.

33. The method of claim 29, further including finding coordinates of the fifth location from the first distance.

34. The method of claim 29, further including finding the first distance in response to a third level of the characteristic for a signal between the fifth location and the one of the first, second, third, and fourth locations.

35. The method of claim 29, further including:
determining a value of a second term of the expression in response to
the first level of the characteristic, the first distance, the second level of the characteristic, and the second distance; and
finding the first distance of the fifth location in response to the determined value of the second term.

36. The method of claim 35 wherein:
the characteristic includes received-signal power;
the first term includes an attenuation coefficient; and
the second term includes a reference-signal power.

37. A tangible computing-apparatus-readable medium storing data that is operable to cause a computing apparatus:
to determine a value of a first term of an expression in response to a first level of a characteristic for a first signal between first and second locations, a first distance between the first and second locations, a second level of the characteristic for a second signal between third and fourth locations, and a second distance between the third and fourth locations; and
to find a first distance of a fifth location from one of the first, second, third, and fourth locations in response to the determined value.

* * * * *